April 28, 1925.
R. D. EVANS ET AL
1,535,590
VOLT AMPERE METER
Filed Oct. 20, 1921
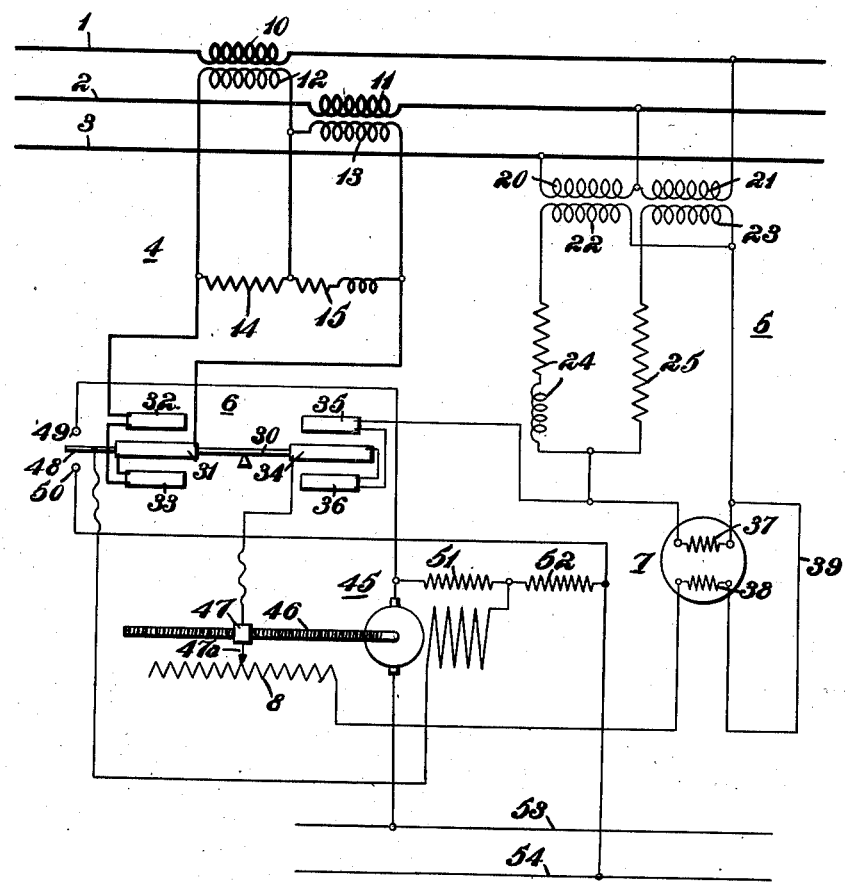
WITNESSES:
INVENTORS
Robert D. Evans and
Raymond T. Pierce.
BY
ATTORNEY Patented Apr. 28, 1925.

1,535,590

UNITED STATES PATENT OFFICE.

ROBERT D. EVANS, OF PITTSBURGH, AND RAYMOND T. PIERCE, OF WILKINSBURG, PENNSYLVANIA, ASSIGNORS TO WESTINGHOUSE ELECTRIC AND MANUFACTURING COMPANY, A CORPORATION OF PENNSYLVANIA.

VOLT-AMPERE METER.

Application filed October 20, 1921. Serial No. 509,020.

*To all whom it may concern:*

Be it known that we, ROBERT D. EVANS, a citizen of the United States, and a resident of Pittsburgh, in the county of Allegheny and State of Pennsylvania, and RAYMOND T. PIERCE, a citizen of the United States, and a resident of Wilkinsburg, in the county of Allegheny and State of Pennsylvania, have invented a new and useful Improvement in Volt-Ampere Meters, of which the following is a specification.

Our invention relates to meters and measuring systems and it has special relation to the measurement of certain electrical quantities in an unbalanced circuit.

In practicing our invention, we utilize the broad principles of indicating the symmetrical components of the unbalanced quantities of an electrical system disclosed in the co-pending application of Charles LeG. Fortescue, Lewis W. Chubb and Joseph Slepian, Serial No. 358,373, filed February 13, 1920, and also in the co-pending application of Chester T. Allcutt, Serial No. 370,229, filed Mar. 31, 1920, both applications being assigned to the Westinghouse Electric & Manufacturing Company.

It has been discovered that any unbalanced polyphase system of electrical quantities may be resolved into two or more symmetrical systems. These quantities, for example, may be resolved into a positive-phase-sequence component, a negative-phase-sequence component and a zero-phase-sequence component. In a three-phase, three-wire system, the zero-phase-sequence component is of zero value and only the positive and the negative-phase-sequence components need be considered.

In the former application, referred to above, a general method and system of apparatus for segregating either of the phase-sequence components of one of the electrical quantities is described and claimed.

In the latter application, referred to above, is described and claimed a method and apparatus for segregating one of the components by stationary resistors and reactors having predetermined relative characteristics.

One object of our invention is to provide a simple and effective means for accurately measuring the unbalanced volt-amperes in a circuit.

More specifically stated, the object of our invention is to provide a device for accurately measuring the product of positive-phase-sequence volts and negative-phase-sequence amperes.

Viewed from another angle, the object of our invention is to provide a wattmeter, or the like, having one coil energized in accordance with positive-phase-sequence voltage and the co-operating coil energized proportionally to negative-phase-sequence current through the agency of a Kelvin balance.

A further object of our invention is to provide a device for indicating the product of two phase-sequence components in a circuit irrespective of the power-factor of the circuit.

Our invention may be best understood by reference to the accompanying drawing, the single figure of which is a diagrammatic view of a measuring system organized in accordance with our present invention.

Referring to the drawing, the system comprises a plurality of supply-circuit conductors 1, 2 and 3 across which an unbalanced voltage may be impressed or upon which such unbalanced voltage-conditions obtain by reason of the distribution of an unbalanced load current.

A negative-phase-sequence producing network or system 4 and a positive-phase-sequence producing network or system 5 are associated with a Kelvin balance 6 and a wattmeter 7, or the like, in such manner that positive-phase-sequence voltage and a current proportional to the negative-phase-sequence current are impressed upon the corresponding windings of the wattmeter 7, as subsequently described in detail.

The negative-phase-sequence network 4 comprises a plurality of primary current transformer windings 10 and 11, which are inserted in the supply circuit conductors 1 and 2, respectively, to energize secondary windings 12 and 13 which have a common intermediate connection. A resistor 14 is connected across the terminals of the secondary winding 12, while a combined resistor and reactor on reactive impedance device 15 of equal absolute value is connected across the terminals of the secondary winding 13. With this arrangement, the impedance device 15 has a voltage impressed thereupon that is proportional to the current traversing the conductor 2, whereas the resistor 14 has a voltage impressed thereupon that is proportional to the current traversing the conductor 1 and therefore equal to that impressed on the device 15 under balanced conditions. The impedance device 15 is of such character that the current traversing the same lags the impressed voltage by 60°, so that the voltage is exactly in opposite phase under balanced conditions with that impressed across the resistor 14. Accordingly, a voltage that is proportional to the negative-phase-sequence component of current is produced at the terminals of the network 4, in accordance with the principles set forth in the above-identified co-pending applications. This component is, therefore, zero under balanced conditions and is impressed upon one set of coils of the Kelvin balance.

The network or system 5 for producing the positive phase-sequence component of the unbalanced voltages of the supply circuit comprises a potential transformer having a plurality of primary coils 20 and 21, connected across the pairs of supply-circuit conductors 3 and 2 and 2 and 1, respectively, and a plurality of secondary windings 22 and 23 which are respectively associated with the primary windings 20 and 21. A combined resistor and reactor or reactive impedance 24 is connected in circuit with the outer terminal of the secondary winding 22, while a resistor 25 of equal absolute impedance is connected in circuit with the inner terminal of the secondary winding 23. The remaining two terminals of the windings 22 and 23 are connected together. The resistor 25 is of such high resistance that the current traversing it is in phase with the voltage across the conductors 2 and 1. On the other hand, the impedance of the combined resistor and reactor 24 is of such value that the current traversing them lags 60° behind the voltage across the conductors 3 and 2 and is therefore in phase with the current traversing the resistor 25 under balanced conditions. The terminals of the entire instrument 5 are directly connected to the voltage coil 37 of the wattmeter 7.

The voltage coil 37 of the wattmeter thus has impressed upon it a voltage proportional to the positive-phase-sequence voltage component of the supply circuit, as fully explained in the above-identified co-pending applications.

The Kelvin balance 6 comprises a suitably fulcrumed balancing member 30, with one end of which is associated a movable coil 31 that is adapted to oscillate in the magnetic path between two co-operating stationary coils 32 and 33, which are connected in series relation with the movable coil 31 across the terminals of the negative-phase-sequence instrument 4.

Upon the other end of the balancing member 30 is disposed a coil 34, which is adapted to operate between two stationary coils 35 and 36, all three coils being connected in series relation with a variable resistor 8 and with the wattmeter current winding 38.

In order to cause movement of the balance lever 30 in the one or the other direction to adjust the resistor 8, a pilot motor 45 is associated with the balancing lever 30 in a manner to be set forth to effect rotation of a worm shaft 46 upon which is mounted a traveling nut 47. A pointer or rheostat arm 47$^a$ is secured to the traveling nut 47 to effect automatic adjustment of the resistor 8 in accordance with the movement of the balancing lever 30.

To control the pilot motor 45, a movable contact member or finger 48 is suitably attached to the coil 31. A plurality of stationary terminals or contact members 49 and 50 are located on opposite sides of the finger 48 to be respectively engaged thereby in the one or the other extreme position of the movable coil.

Co-operating with the contact members 48, 49 and 50 are a plurality of resistors 51 and 52 which are connected through the armature of the pilot motor across a suitable direct-current supply circuit comprising contactors 53 and 54. The terminals of the pilot motor field winding are respectively connected to the movable finger 48 and the junction-point of the resistors 51 and 52.

Since the illustrated pilot-motor connections are familiar to those skilled in the art, no detailed description thereof or of the pilot-motor operation are deemed necessary.

It will be sufficient to state that movement of the coil 31 in the upward direction to effect contact with the terminal 49 produces movement of the pilot motor in the one direction, while the opposite direction of movement is obtained through contact with the lower terminal 50. Such energization of the pilot motor effects a corresponding degree of movement of the traveling nut 47 to adjust the active value of the resistor 8 in the one or the other direction. This action produces a current in the circuit thereof that is exactly proportional to the current traversing the non-corresponding balance coil 31. As soon as the variation of the resistor 8 is sufficient to counteract the initial change of current values that produces movement of the balance, the balance returns to its illustrated normal or open-circuit position, although, of course, the arm 47ᵃ remains in the position to which it was moved until another actuation of the Kelvin balance produces further energization of the pilot motor to actuate the arm 47ᵃ in the one or the other direction.

As previously mentioned, the voltage coil 37 of the wattmeter 7 has impressed upon it a voltage proportional to the positive-phase-sequence component of the supply circuit. On the other hand, the current traversing the current coil 38 of the wattmeter, while in phase with the positive-sequence voltage by reason of its connection to the terminals of the system 5, may be made proportional to the negative-phase-sequent current by automatically adjusting the variable resistor 8 as just described.

This result follows from the fact that the current in the movable coil 31 and the associated coils 32 and 33 is proportional to the negative-phase-sequence current that is derived from the system 4. The current traversing the other movable coil 34 and its associated coils 35 and 36 is dependent upon the adjustment of the resistor 8 and therefore upon the current traversing the opposite coils 31, 32 and 33. Therefore, the desired proportionality of the current in the wattmeter coil 38 to the negative-phase-sequence current in the movable coil 31 of the Kelvin balance may be obtained by the automatic adjustment of the resistor 8 in accordance with the movements of the balance.

It will be seen that we have thus provided a system wherein the product of the positive and negative-phase-sequence components of an unbalanced circuit may be accurately measured by means of a wattmeter having one coil energized proportionally to the positive-phase-sequence components of the voltage and a second coil energized in accordance with the negative-phase-sequence current through the agency of a Kelvin balance. In this way, the wattmeter measures the product of the positive-phase-sequence voltage and the negative-phase-sequence amperes, or, in other words, the unbalanced volt-amperes of the unsymmetrical load.

Furthermore, the wattmeter 7 indicates the true product of the two phase-sequence components in question, irrespective of the power-factor of the circuit. That is, the currents supplied to the voltage winding 37 and the current winding 38 of the wattmeter have a constant phase relationship because of their mutual connection to the phase-sequence device 5.

It will be understood that our invention may be readily applied to other polyphase circuits and to other combinations of components, the present embodiment being for illustrative purposes only.

Consequently, we do not wish to be restricted to the specific circuit connections or arrangements of parts herein set forth, as various modifications thereof may be made without departing from the spirit and scope of our invention. We desire, therefore, that only such limitations shall be imposed as are indicated in the appended claims.

We claim as our invention:

1. A measuring device for a polyphase circuit comprising an indicating element embodying two windings, means energized from the circuit to energize one winding in accordance with one symmetrical component of an unbalanced quantity, control means for deriving a force from said energized means to energize the second winding, and means for controlling said control means in accordance with another symmetrical component of a quantity of the circuit.

2. A measuring device for a polyphase circuit comprising an indicating element embodying two windings, means energized from the circuit to energize one winding in accordance with one symmetrical component of an unbalanced quantity, means for segregating a force from the circuit in accordance with the value of another symmetrical component of a quantity of the circuit, and a balance device for controlling the energization of the second winding in accordance with the value of the segregated force.

3. A measuring device for a polyphase circuit comprising two windings, means for segregating one symmetrical component of a quantity of the circuit to impress that component upon one winding, means for segregating another component of a quantity of the circuit, a balance device energized through said latter means, and means controlled by the balance device for energizing the second winding.

4. A measuring device for a polyphase circuit comprising a meter provided with two windings, means for segregating a voltage force to influence one winding in accordance with a symmetrical component of the circuit voltage, means for segregating a current force proportional to a symmetrical component of the circuit current, and means controlled by said current force for controlling the energization of the second winding.

5. A measuring device for a polyphase circuit comprising means for producing different rotational components of unbalanced quantities of said circuit, a balancing device energized in accordance with said components, and an indicating device having one coil energized directly by one of said components and having a second coil energized in accordance with another component through said balancing device.

6. A measuring device for a polyphase circuit comprising means for producing positive and negative-phase-sequence components of the circuit voltage and current, a Kelvin balance having one coil energized directly by one of said components, and an indicating device having one coil energized directly by one of said components and having a second coil energized from that component through the opposing coil of said balance.

7. A measuring device for a polyphase circuit comprising means for producing positive and negative-phase-sequence components of the circuit voltage and current, a Kelvin balance having one coil energized by the negative-phase-sequence component of current, and an indicating device having one coil connected to be energized by the positive-phase-sequence component of the voltage and having a second coil energized by a current in phase with the last-named component but proportionally to the other component by connection with the opposing coil of said Kelvin balance.

8. A measuring device for a polyphase circuit comprising a plural-element electro-responsive device, and means for energizing said elements with currents having the same phase relationship and proportional to different phase-sequence components of the electrical quantities traversing the circuit irrespective of the change in phase relationship of said quantities.

9. A measuring device for a polyphase circuit comprising an electro-responsive device having a voltage and a current coil, and means for energizing said coils with currents having the same phase relationship and proportional to different phase-sequence components of the electrical quantities traversing the circuit independent of variations in the power-factor thereof.

10. A measuring device for a polyphase circuit comprising an electro-responsive device having a voltage and a current coil, and means for energizing said coils with currents of the same phase and in accordance with the positive and the negative phase-sequence components, respectively, of the electrical quantities traversing the circuit irrespective of variations in the power-factor thereof.

In testimony whereof, we have hereunto subscribed our names this 17th day of October, 1921.

ROBERT D. EVANS.
RAYMOND T. PIERCE.